US012174073B2

(12) United States Patent
Bischoff et al.

(10) Patent No.: US 12,174,073 B2
(45) Date of Patent: Dec. 24, 2024

(54) METHOD AND DEVICE FOR IDENTIFICATION OF EFFECT PIGMENTS IN A TARGET COATING

(71) Applicant: BASF COATINGS GMBH, Münster (DE)

(72) Inventors: Guido Bischoff, Muenster (DE); Donald R Baughman, Whitehouse, OH (US); Matthew Leopold, Whitehouse, OH (US); Stuart K Scott, Southfield, MI (US)

(73) Assignee: BASF COATINGS GMBH, Muenster (DE)

( * ) Notice: Subject to any disclaimer, the term of this patent is extended or adjusted under 35 U.S.C. 154(b) by 300 days.

(21) Appl. No.: 17/755,885

(22) PCT Filed: Nov. 12, 2020

(86) PCT No.: PCT/EP2020/081979
§ 371 (c)(1),
(2) Date: May 11, 2022

(87) PCT Pub. No.: WO2021/094496
PCT Pub. Date: May 20, 2021

(65) Prior Publication Data
US 2022/0381615 A1    Dec. 1, 2022

(30) Foreign Application Priority Data
Nov. 14, 2019    (EP) ..................................... 19209119

(51) Int. Cl.
*G01J 3/46* (2006.01)
*B44D 3/00* (2006.01)
(Continued)

(52) U.S. Cl.
CPC ............... *G01J 3/463* (2013.01); *G01J 3/504* (2013.01); *G06T 7/90* (2017.01); *G06V 10/54* (2022.01);
(Continued)

(58) Field of Classification Search
None
See application file for complete search history.

(56) References Cited

U.S. PATENT DOCUMENTS 6,952,265 B2    10/2005    Prakash et al.
8,290,275 B2    10/2012    Sai et al.
(Continued)

FOREIGN PATENT DOCUMENTS

| EP | 1814044 A1 | 8/2007 |
| WO | 02063556 A2 | 8/2002 |
| WO | 2008150378 A1 | 12/2008 |

OTHER PUBLICATIONS

International Search Report and Written Opinion for corresponding PCT/EP2020/081979 mailed Jan. 18, 2021, 11 pages.

*Primary Examiner* — Dominic J Bologna
(74) *Attorney, Agent, or Firm* — Armstrong Teasdale LLP (57) ABSTRACT

Disclosed herein is a computer-implemented method, a respective device, and a non-transitory computer-readable medium. The method includes:
  obtaining color values, texture values and digital images of a target coating,
  retrieving from a database one or more preliminary matching formulas based on the color and/or texture values obtained for the target coating,
  determining sparkle points within the respective obtained images and within the respective images associated with the one or more preliminary matching formulas,
  creating subimages of each sparkle point from the respective images,
(Continued)

providing the created subimages to a convolutional neural network, the convolutional neural network being trained to correlate a respective subimage of a respective sparkle point with a pigment and/or pigment class, and determining, based on an output of the neural network, at least one of the one or more preliminary matching formulas as the formula(s) best matching the target coating.

15 Claims, 7 Drawing Sheets

(51) Int. Cl.
| | |
|---|---|
| *G01J 3/50* | (2006.01) |
| *G01N 21/25* | (2006.01) |
| *G01N 21/47* | (2006.01) |
| *G06T 7/90* | (2017.01) |
| *G06V 10/54* | (2022.01) |
| *G06V 10/56* | (2022.01) |
| *H04N 1/60* | (2006.01) |

(52) U.S. Cl.
CPC ........... *G06V 10/56* (2022.01); *H04N 1/6038* (2013.01); *B44D 3/003* (2013.01); *G01N 21/25* (2013.01); *G01N 2021/4711* (2013.01); *G01N 21/4738* (2013.01); *G06T 2207/10024* (2013.01); *G06T 2207/20081* (2013.01); *G06T 2207/20084* (2013.01); *G06T 2207/30108* (2013.01)

(56) References Cited

U.S. PATENT DOCUMENTS

| | | | |
|---|---|---|---|
| 10,147,043 B2 | 12/2018 | Beymore | |
| 10,697,833 B2 | 6/2020 | Vignolo et al. | |
| 2004/0073526 A1* | 4/2004 | McClanahan | G01J 3/462 356/402 |
| 2007/0172113 A1* | 7/2007 | Sai | G01N 21/25 382/162 |
| 2009/0157212 A1 | 6/2009 | McClanahan et al. | |
| 2014/0195468 A1* | 7/2014 | Mohammadi | G06N 3/02 706/21 |
| 2014/0242271 A1* | 8/2014 | Prakash | B60S 5/00 356/73 |
| 2021/0310870 A1* | 10/2021 | Kettler | G06T 7/90 |

* cited by examiner

METHOD AND DEVICE FOR IDENTIFICATION OF EFFECT PIGMENTS IN A TARGET COATING

CROSS-REFERENCE TO RELATED APPLICATIONS

This application is a U.S. National Phase Application of International Patent Application No. PCT/EP2020/081979, filed Nov. 12, 2020, which claims priority to European Patent Application No. 19209119.7, filed Nov. 14, 2019, each of which is hereby incorporated by reference herein.

FIELD OF THE INVENTION

The present invention refers to a computer-implemented method and a device for identification of effect pigments in a target coating.

BACKGROUND OF THE INVENTION

Today, for the color search and retrieval process additional features like e.g. coarseness, sparkle area, sparkle intensity, sparkle grade and/or sparkle color variation/distribution are used as side condition, beside color information, to find an optimal solution for a given target color/target coating. These additional features are matrices for different visual properties of the texture appearance of a color.

These additional features are typically derived from image raw data of the target coating captured by today's photospectrometer instruments like e.g. Xrite MA-T6®, MA-T12® or Byk mac i®. The image raw data are processed by image processing algorithms. As output of those algorithms texture features, i.e. texture values are gained which are supposed to represent optical properties of the texture of the target coating. Those texture values are classified according to known industry standards.

Due to the nature of complex coating mixtures, it is sometimes difficult to formulate, identify, and/or search for acceptable matching formulations and/or pigmentations. Ideally, a human being could view a complex coating mixture and determine the appropriate pigments within the coating mixture. However, in reality the pigments in a coating mixture may not be readily available in a set of toners of a paint system that is to be utilized to make a matching coating. Thus, a person skilled in color matching has to make a determination as to whether the paint system contains appropriate offsets and, if so, must determine additional changes which need to be made to accommodate the offsets given that they are not identical matches to the original pigmentation.

It would be desirable to have a method and a device that can measure an unknown target coating and can search, based on the measured data of the target coating, a database for the best matching coating formula within the database and/or that can create, based on the measured data of the target coating, a new coating formula. However, as to now, known systems are only able to determine a color or bulk effect pigment type, but generally cannot assist in determination of, for example, a specific pearl necessary for matching the unknown target coating.

Known techniques using cameras and/or spectrometers, optionally combined with microscopic evaluation of a target coating, are generally not appropriately defined to efficiently address new effect pigmentations or complex mixtures and are largely focused on an individual evaluation of the target coating, i.e. on an analysis from case to case which is a very time consuming process as each new unknown target coating requires to pass through all analyse steps. Thus, such time consuming process may not satisfactorily address application issues which require a time efficient analysis of the target coating combined with a provision of a matching formula.

There are further strategies using painted or virtual samples representing various textures, and then comparing those to the unknown target coating. However, such techniques often require substantial user intervention and, thus, are subjective, which may produce inconsistent results.

Thus, a need exists for a method and a device that are suitable for efficiently analyzing unknown target coatings comprising effect pigments.

SUMMARY OF THE INVENTION

The above-mentioned objects are solved by the method and the device with the features of the respective independent claims. Further embodiments are presented by the following description and the respective dependent claims.

The present disclosure refers to a computer-implemented method, the method comprising at least the following steps:
   measuring/obtaining, using at least one measuring device, color values, texture values and digital images of a target coating,
   retrieving from a database which comprises formulas for coating compositions and interrelated color values, interrelated texture values, and interrelated digital images, one or more preliminary matching formulas based on the color values and/or the texture values obtained for the target coating,
   performing, using a computer processor in operative conjunction with at least one filtering technique, for each of the obtained images of the target coating and the images interrelated/associated with the one or more preliminary matching formulas, an image analysis to look for and to determine/identify at least one sparkle point, i.e. to determine/identify possibly existing sparkle points within the respective images,
   creating subimages of each sparkle point from the respective obtained images and from the respective images associated with the one or more preliminary matching formulas,
   providing the created subimages to a convolutional neural network, the convolutional neural network being trained to correlate a respective subimage of a respective sparkle point with a pigment and/or pigment class and to identify the pigment and/or pigment class based on the respective subimage of the respective sparkle point,
   determining and outputting, for the target coating and for each preliminary matching formula, a statistic of the identified pigments and/or pigment classes, respectively,
   comparing, using a computer processor, the statistic determined for the target coating with the statistics determined for the one or more preliminary matching formulas, and
   determining at least one of the one or more preliminary matching formulas as the formula(s) best matching with the target coating.

The terms "formula" and "formulation" are used synonymously herein. The wording "in operative conjunction" means that the respective components, i.e. the computer processor and the at least one filtering technique, are in communication with each other in such a way that the computer processor can control/operate the at least one filtering technique and/or that the at least one filtering technique can transmit respective filtering results to the computer processor. The terms "associated with" and "interrelated with" are used synonymously. Both terms indicate a togetherness of the components which are associated/interrelated with each other.

The color values are obtained, using the at least one measuring device, by analysing spectral curves of the target coating, the spectral curves being measured at different measurement geometries with respect to a surface of the target coating. Generally, a spectral measurement geometry is defined by an illumination direction/angle and an observation direction/angle. Typical spectral measurement geometries are a fixed illumination angle at 45° measured relative to the surface normal of the coating and viewing angles of −15°, 15°, 25°, 45°, 75°, 110°, each measured relative to the specular angle, i.e. the specular direction, the specular direction being defined as the outgoing direction that makes the same angle with the normal of the coating surface as the incoming direction of the respective light ray.

The image values and the texture values are obtained by capturing, using an image capturing device, multiple digital images, particularly HDR images, each obtained at a different measurement geometry with respect to a surface of the target coating. Typical image-based texture measurement geometries are a fixed position for the image capturing device, i.e. a camera, at 15° to the nominal of the surface of the target coating. The illumination angles are chosen as r15as-15, r15as15, r15as-45, r15as45, r15as80 and semi-diffuse as defined from X-Rite MAT6®. "Semi-diffuse" means here "as diffuse as possible" with respect to the measuring device and its spatial dimensions. Regarding the geometric designations the positions of the at least one measuring device, e.g. the camera, and of the illumination are reversed. That means that the specular angle is here defined by the fixed position of the camera. Specifically, this means: the designation "r15as-15", for example, denotes "reverse" with "r", with "15" the fixed position of the camera, namely at an angle of 15° to the nominal of the surface of the target coating, with "as" "aspecular" and with "−15" the illumination angle measured relative to the specular angle.

The texture values/parameters are particularly sparkle grade SG, sparkle color variation CV and coarseness C or graininess G, sparkle intensity S_i and sparkle area S_a of the target coating.

The at least one measuring device may be chosen as a photospectrometer like e.g. Xrite MA-T6®, Xrite MA-T12® or Byk mac i®. Such photospectrometer may also be combined with further suitable devices such as a microscope in order to gain still more image data, like e.g. microscope images.

The database is a formulation database which comprises formulas for coatings compositions and interrelated colorimetric data. The interrelated colorimetric data comprise, for each formula, spectral data, i.e. color values, texture values and digital images of a sample coating based on the respective formula. The preliminary matching formulas are chosen among the plurality of formulas of the database based on a first matching metric. The first matching metric is defined/calculated by a color difference metric between target coating and respective sample coating for all or at least some of the above mentioned spectral measurement geometries, e.g. CIE dE* and, optionally supplementary by at least one texture difference metric, e.g. by at least one of the texture differences dSi, dSa, dG as defined by Byk-Gardner ["Beurteilung von Effektlackierungen, Den Gesamtfarbeindruck objektiv messen", Byk-Gardner GmbH]. The color difference metric and the at least one texture difference metric can be summed up, optionally by a weighted sum. The color difference metric can be described by: CIE dE*= $\sqrt{dL^{*2}+da^{*2}+db^{*2}}$ with the three color values: L* for the lightness from black (0) to white (100), a* from green (−) to red (+), and b* from blue (−) to yellow (+).

After obtaining the digital images of the target coating, it may be useful to perform first a pre-analysis of the digital images for identifying defects, such as scratches. Therefore, using the electronic computer processor in an operative connection with at least one filtering unit, a first image analysis on the obtained digital images is performed to determine within each digital image at least one bright region by isolating image foreground data from image background data. Afterwards, for each digital image, a blob analysis is performed to determine at least one corrupt area within the at least one bright region; and if at least one corrupt area is found, the at least one corrupt area is masked out for further analysis of the respective digital image, the respective digital image is rejected and/or a repetition of the image capturing is initiated.

This pre-analysis allows detecting defects in an image of the target coating. The basic strategy of the proposed pre-analysis is to (1) find defects in the image by searching for typical structure properties of e.g. finger prints and scratches and to (2) decide to either reject the image or to ignore the detected corrupted/defective areas in the image for further image processing.

That means that measurements including images with defects can either be rejected or defect/corrupt areas in images can be masked out for a further texture analysis of the respective image. The pre-analysis can also be configured in the way that the user of the image capturing device gets informed about that the measurement (the obtained at least one digital image) was not valid, e.g. by throwing/outputting a warning message/signal via the computer processor on an output device, such as a display and/or an acoustic output device, the output device being part of the computer processor or being in communication with the computer processor. It can also ask the user to re-measure the coating until the measurement data, i.e. the obtained digital image is valid. It is also possible that the image capturing is automatically repeated by the image capturing device until the obtained digital image is valid, i.e. without detectable defects. Thereby, the image capturing device is automatically informed about the detected at least one corrupt area/defect within the respective one image via a communicative connection between the image capturing device and the electronic computer processor.

Thus, more accurate results and a reduction of errors in the color search and retrieval process can be reached. Further, a reduction of laboratory effort for color development and for customer service matching is gained. The color matching process gets more reliable and faster, accompanied by a cost reduction in operational units.

The wording "to be in communication with" indicates that there is a communicative connection between the respective components.

After retrieving from the formulation database the one or more preliminary matching formulas, base statistics of pigments and/or pigment classes from the images of the target coating and from the images interrelated with the preliminary matching formulas are calculated.

Then, at least one from the one or more preliminary matching formulas is selected as best matching formula so as to minimize the first matching metric and the new sparkle differences based on the statistics of pigments and/or pigment classes for the target coating and the one or more preliminary matching formulas. That means that based on the statistics of pigments and/or pigment classes for the target coating and the one or more preliminary matching formulas, i.e. based on a comparison of those statistics the at least one preliminary matching formula can be identified whose sparkle differences with respect to the respective sparkle points of the target coating are minimal (whose sparkle points have the minimum sparkle distance from the respective sparkle points of the target coating).

The statistic determined for the target coating and the statistics determined for the one or more preliminary matching formulas can each be presented as a respective histogram and/or as a respective vector.

Further, the subimages of each sparkle point from the obtained images and from the images associated with the one or more preliminary matching formulas may be created with and/or without background, i.e. with real surroundings of the sparkle point and/or with a uniform background, particularly with a black background (corresponding to "without background").

According to one embodiment of the proposed method, the method further comprises deriving, using the neural network, from each subimage depicting exactly one sparkle point, a correlation of the sparkle point with at least one pigment and/or pigment class, wherein the correlation indicates a contribution of the at least one pigment and/or pigment class to a distribution of the sparkle points within the respective image from which the subimage had been cut out. Advantageously, from each subimage, using the neural network, a correlation of the depicted respective sparkle point with exactly one pigment is derived. For each image, the subimages are created in a way such that the image is composed of the subimages. Generally, the number of subimages is determined implicitly by the number of sparkle points within the image and lies in an interval from 100 to 1000, e.g. from 200 to 500.

In the case of n sparkle points in a digital image which has been captured of the target coating or which is associated with a formulation of a coating composition and retrieved from the database, n subimages are created and it may result that a number S1 of subimages being correlated with pigment 1, a number S2 of subimages being correlated with pigment 2, and so on, until a number Sk of subimages being correlated with pigment k, with k being greater than 2 and smaller or equal than n, with k, n, both being integer numbers.

The numbers S1, S2, . . . , Sk together with the respective pigments 1, 2, . . . , k allow to compile a statistic about the respective fraction of the different pigments 1, 2, . . . , k within the target coating, i.e. within the formula associated with the target coating and/or within the formulation associated with the respective digital image.

The proposed method can be performed in addition, particularly previously or subsequently to further pigment identification methods using a sparkle color distribution and/or a sparkle size distribution. Such methods are described, for example, in US 2017/0200288 A1 and the European Application with application Ser. No. 19/154, 898.1, the content of the last one being completely included herein by reference.

Finally, the best matching formula(s) is (are) identified and forwarded to a mixing unit which is configured to produce/mix a paint/coating composition based on the identified best matching formula. The mixing unit produces such paint/coating composition which can then be used in place of the target coating. The mixing unit may be a component of the proposed device.

The neural network which can be used with the proposed method is based on a learning process referred to as backpropagation. The neurons of the neural network are arranged in layers. These layers include a layer with input neurons (input layer), a layer with output neurons (output layer), and one or more inner layers. The output neurons are the pigments, i.e. toners, or pigment classes which are to be determined/predicted looking for the (paint) formulation of the target coating.

Input neurons used for the neural network in the training phase as training data are subimages of images of sample coatings, each sample coating being based on a formulation which comprises exactly one previously known pigment/toner. Each such subimage depicts exactly one sparkle point of the respective image from which it is cut out.

The inner layers of the convolutional neural network consist of all or a subset of convolutional layers, max pooling layers, and fully connected dense layers. The convolutional+RELU (rectified linear unit) layer applies a filter on input neurons, i.e. an input image, to extract features from the input image/incoming image. The pooling layer is responsible for reducing the dimensionality of the features from the convolution. The dense layer is a standard fully-connected set of neurons in a neural network that maps the high-level features from convolutional+RELU and max pooling layers onto desired pigment and/or pigment class.

Generally, a precise correlation of a sparkle point with a pigment requires a high quantity of training data. As an image of a sample coating which is based on a formulation which comprises exactly one previously known pigment/toner, generally shows a high number of sparkle points and as for each such sparkle point a subimage is created, a correspondingly high number of subimages is obtained. Thus, a sufficiently high number of training data can be created, although the number of available pigments is countable, i.e. limited. The number of training data, i.e. the number of available subimages can be further augmented by using, for each pigment, both, subimages with black background and subimages with any other suitable background.

Only in the event of any change in the number/multitude of available pigments, the neural network must be redefined, retrained, and retested.

A "previously known pigment/toner" means a pigment which is known and available as color component for color formulations.

The wording "formulas for coating compositions and associated images" means formulas for coating compositions and images which have been captured of the respective coatings. The wording "images associated with the one or more preliminary matching formulas" means images which have been captured of respective coatings of the one or more preliminary matching formulas, respectively.

The proposed method serves in particular for providing a statistic about different pigments being correlated with the identified sparkle points within the image of the target coating, thus concluding which pigments with which quantity form part of the formulation of the target coating. The neural network used is based on a learning process referred to as backpropagation. Backpropagation should be understood here as a generic term for a supervised learning process via error feedback. There are a variety of backpropagation algorithms: e.g. Quickprop, Resilient Propagation (RPROP). This process uses a neural network comprising at least three layers: a first layer with input neurons, an nth layer with output neurons, and (n−2) inner layers, where n is a natural number greater than 2. In such a network the output neurons serve to identify the pigment class and/or the pigments comprised by the target coating, i.e. by the corresponding formulation.

"To identify a/the pigment" means to directly determine the concrete pigment and/or to determine a pigment class to which the pigment belongs to. For instance, one pigment class could be constituted by metallic effect pigments and a further pigment class could be constituted by pearlescent effect pigments. Other suitable categorizations, particularly further refined categorizations are possible. It is e.g. possible to intersect the pigment class "metallic" into "coarse metallic" and "fine metallic" or into "small coarse/fine metallic" or "big coarse/fine metallic". It is possible to provide a pigment class "aluminium pigments" and a further class "interference pigments". The class "aluminium pigments" can be further subdivided into subclasses, such as a subclass "cornflakes" and a subclass "silverdollars". The class "interference pigments" can be further subdivided into the subclasses "white mica", "golden mica", "blue mica" and further into the subclasses "Xirallic®", "glass", "natural mica" etc. After comparison of the statistics some of the classes or subclasses can also be reunited appropriately.

According to one possible embodiment of the proposed method, the image analysis uses image segmentation techniques to identify the location of the sparkle points in each image. An image mask is created that identifies the location of sparkle point locations based on color, texture, and their gradients. Within the mask every pixel is labelled with either '0', meaning that the pixel is not part of a sparkle point, or '1' meaning that the pixel is part of a sparkle point. Contour detection of the masked image identifies boundaries of the connected pixels for each individual sparkle point location. The identified sparkle point contours are overlaid on the original HDR (High Dynamic Range) image. Subimages are created for all sparkle points identified in the mask by extracting the RGB (derived from Red Green Blue color space) pixel data from the original HDR image for the associated pixel locations and placing the RGB pixel data in the center of a standard image frame where the RGB pixel data of this standard image frame was previously initialized with '0' (black) in order to provide a defined background.

Alternative or additional segmentation techniques include threshold methods, edge-based methods, clustering methods, histogram-based methods, neural network-based methods, hybrid methods, etc.

According to still a further aspect of the proposed method, a correlation of each subimage with at least one pigment and/or pigment class is derived by means of the convolutional neural network which is configured to classify each subimage of a respective sparkle point for each measurement geometry with a pre-given probability to a specific pigment and/or a specific pigment class.

Each such derived correlation for each measurement geometry, at which the respective subimage is taken, is used to adapt a contribution of the at least one pigment when determining the best matching formula.

According to still a further aspect of the proposed method, the step of determining the best matching formula comprises providing a list of pigments with respective quantities and/or concentrations of the respective pigments.

In the case that a sparkle point is correlated with a pigment class, a determination of a concrete pigment within said identified pigment class can be performed by use of any one of the above mentioned methods or a combination thereof using a sparkle color distribution and/or a sparkle size distribution within a respective image. Alternatively the choice of a concrete pigment can be done by human input/decision.

Generally, an image area of a subimage is defined by a sparkle size of the sparkle point depicted by the respective subimage. It is possible that all subimages of the respective image are created with a same image area. In such case, the image area is defined by the sparkle size of the biggest sparkle point of the respective image, i.e. by the maximum sparkle size. A typical image area can be an image area of 1010 pixels in a black background.

The present disclosure further refers to a device. The device comprises at least:
a database, which comprises formulas for coating compositions and interrelated color values, interrelated texture values, and interrelated digital images,
at least one processor, which is in communicative connection with at least one measuring device, the database, at least one filtering technique, and a convolutional neural network, and programmed to execute at least the following steps:
 a. receiving, from the measuring device, color values, texture values and digital images of a target coating,
 b. retrieving from the database one or more preliminary matching formulas based on the color values and/or the texture values received for the target coating,
 c. performing, by using the filtering technique, for each of the received images of the target coating and the images interrelated with the one or more preliminary matching formulas, an image analysis to look for and to determine at least one sparkle point within the respective images,
 d. creating subimages of each sparkle point from the received images and from the images interrelated/associated with the one or more preliminary matching formulas,
 e. providing the created subimages to the convolutional neural network, the convolutional neural network being trained to correlate a respective subimage of a respective sparkle point with a pigment and/or a pigment class, and to identify the pigment and/or the pigment class based on the respective subimage of the respective sparkle point,
 f. determining and outputting, for the target coating and for each preliminary matching formula, a statistic of the identified pigments and/or pigment classes, respectively,
 g. comparing the statistic determined for the target coating with the statistics determined for the one or more preliminary matching formulas, and
 h. determining at least one of the one or more preliminary matching formulas as the formula(s) best matching with the target coating.

According to still a further aspect, the device also comprises the at least one measuring device, the filtering technique and/or the convolutional neural network.

According to another embodiment of the proposed device, the processor is further configured to execute the step of deriving from each subimage a correlation with at least one pigment and/or pigment class, wherein the correlation indicates a contribution of the at least one pigment and/or pigment class to a distribution of the sparkle points within the respective image from which the subimage had been cut out.

The processor may be further configured to derive a correlation of each subimage for each measurement geometry with at least one pigment and/or pigment class by means of the convolutional neuronal network which is configured to associate each subimage of a respective sparkle point for each measurement geometry (with a pre-given probability) with a specific pigment and/or a specific pigment class.

The processor may be further configured to use each derived correlation for each measurement geometry, at which the respective subimage is taken, to adapt/estimate/determine a contribution of the at least one pigment and/or pigment class when determining the best matching formula(s).

The proposed device may comprise an output unit which is configured to output the determined best matching formula(s).

The proposed device is particularly configured to execute an embodiment of the above described method.

Generally, at least the database (also called formulation database) and the at least one processor are networked among each other via respective communicative connections. In the case that the at least one measuring device, the filtering technique and the convolutional neural network are separate components (i.e. not implemented on the at least one processor), whether internal components of the device or whether external components, the database and the at least one processor are also networked with those components via respective communicative connections, i.e. they are in communication with each other. Each of the communicative connections between the different components may be a direct connection or an indirect connection, respectively. Each communicative connection may be a wired or a wireless connection. Each suitable communication technology may be used. The formulation database, the at least one processor, each may include one or more communications interfaces for communicating with each other. Such communication may be executed using a wired data transmission protocol, such as fiber distributed data interface (FDDI), digital subscriber line (DSL), Ethernet, asynchronous transfer mode (ATM), or any other wired transmission protocol. Alternatively, the communication may be wirelessly via wireless communication networks using any of a variety of protocols, such as General Packet Radio Service (GPRS), Universal Mobile Telecommunications System (UMTS), Code Division Multiple Access (CDMA), Long Term Evolution (LTE), wireless Universal Serial Bus (USB), and/or any other wireless protocol. The respective communication may be a combination of a wireless and a wired communication.

The processor may include or may be in communication with one or more input devices, such as a touch screen, an audio input, a movement input, a mouse, a keypad input and/or the like. Further the processor may include or may be in communication with one or more output devices, such as an audio output, a video output, screen/display output, and/or the like.

Embodiments of the invention may be used with or incorporated in a computer system that may be a standalone unit or include one or more remote terminals or devices in communication with a central computer, located, for example, in a cloud, via a network such as, for example, the Internet or an intranet. As such, the processor described herein and related components may be a portion of a local computer system or a remote computer or an online system or a combination thereof. The formulation database and software described herein may be stored in computer internal memory or in a non-transitory computer readable medium.

Within the scope of the present disclosure the database may be part of a data storage unit or may represent a data storage unit itself. The terms "database" and "data storage unit" are used synonymously.

The present disclosure further refers to a non-transitory computer readable medium with a computer program with program codes that are configured, when the computer program is loaded and executed by at least one processor, which is in a communicative connection with at least one measuring device, a database, a filtering technique and a convolutional neural network, to execute at least the following steps:

A. receiving, from the measuring device, color values, texture values and digital images of a target coating, B. retrieving from the database which comprises formulas for coating compositions and interrelated color values, interrelated texture values, and interrelated digital images one or more preliminary matching formulas based on the color values and/or the texture values obtained for the target coating, C. performing, by using the filtering technique, for each of the obtained images of the target coating and the images interrelated with the one or more preliminary matching formulas, an image analysis to determine at least one sparkle point within the respective images, D. creating subimages of each sparkle point from the received images and from the images associated/interrelated with the one or more preliminary matching formulas, E. providing the created subimages to the convolutional neural network, the convolutional neural network being trained to correlate a respective subimage of a respective sparkle point with a pigment and/or a pigment class and to identify the pigment and/or the pigment class based on the respective subimage of the respective sparkle point, F. determining and outputting, for the target coating and for each preliminary matching formula, a statistic of the identified pigments and/or pigment classes, respectively, G. comparing the statistic determined for the target coating with the statistics determined for the one or more preliminary matching formulas, and H. determining at least one of the one or more preliminary matching formulas as the formula(s) best matching with the target coating.

The invention is further defined in the following examples. It should be understood that these examples, by indicating preferred embodiments of the invention, are given by way of illustration only. From the above discussion and the examples, one skilled in the art can ascertain the essential characteristics of this invention and without departing from the spirit and scope thereof, can make various changes and modifications of the invention to adapt it to various uses and conditions.

BRIEF DESCRIPTION OF THE DRAWINGS

FIG. 3 shows in FIG. 3a an image of a target coating captured at a given image-based measurement geometry, in FIG. 3b the image of FIG. 3a filtered during image analysis, in FIG. 3c detected sparkle points within the image of FIG. 3a.

DETAILED DESCRIPTION OF THE DRAWINGS

Figure 1:
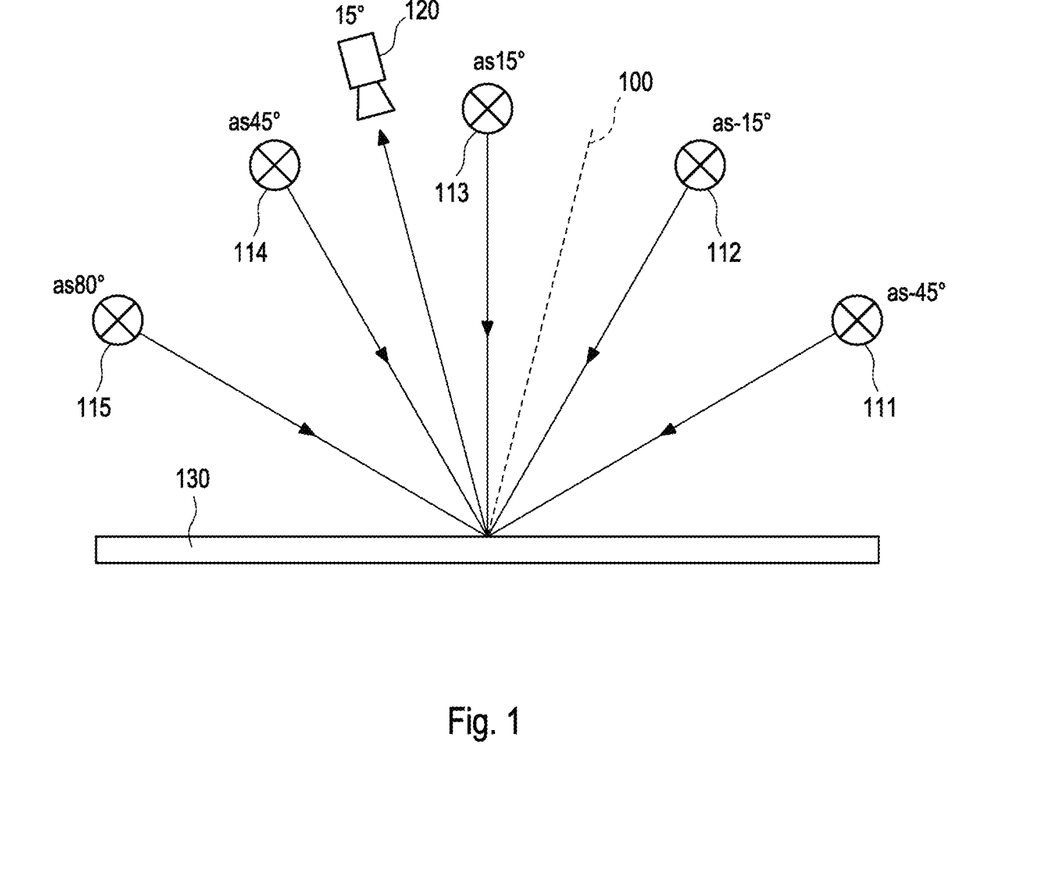
FIG. 1 illustrates possible image-based measurement geometries with angles labeled according to standard multi-angle spectrometer and/or color camera terminology.

Traditional photospectrometers and image capturing devices consider as possible image-based measurement geometries light sources 111 to 115 and camera 120 represented in FIG. 1. FIG. 1 uses industry accepted terminology to describe the angles of the light sources 111 to 115 in relation to the specular angle 100. The traditional mathematical standard is used herein. In various embodiments, traditional light sources 111 to 115 that use diffuse or collimated color corrected light may be used and an image capturing device (e.g., a color camera with appropriate resolution) 120 may be used to collect images of a target coating 130 by illuminating at one, some, or all of the identified or similar angles of the light sources 111 to 115.

After obtaining the digital images of the target coating, it may be useful to perform first a pre-analysis of the digital images for identifying defects, such as scratches. Therefore, using an electronic computer processor in an operative connection with at least one filtering unit, a first image analysis on the obtained digital images is performed to look for and to determine within each digital image at least one bright region by isolating image foreground data from image background data. Afterwards, for each digital image, a blob analysis is performed to look for and to determine at least one corrupt area within the at least one bright region; and if at least one corrupt area is found, the at least one corrupt area is masked out for further analysis of the respective digital image, the respective digital image is rejected and/or a repetition of the image capturing is initiated.

In the course of a subsequent image analysis, a high pass filter may be applied to each of the images of the target coating which have been obtained from the image capturing device to determine the brightest spots amongst the various pixels in the image. The resultant data/image may include information on only the bright locations. The high pass filter may convolve a matrix of values with a high value center point and low value edge points with the matrix of intensity information of the image. This isolates high intensity pixels which can be identified as sparkle points. To further refine the sparkle points, an edge detection method of filtering may be applied in conjunction with the intensity filtering. The same procedure is applied to each of the images associated with the one or more preliminary matching formulas which are retrieved from a database.

Figure 2:
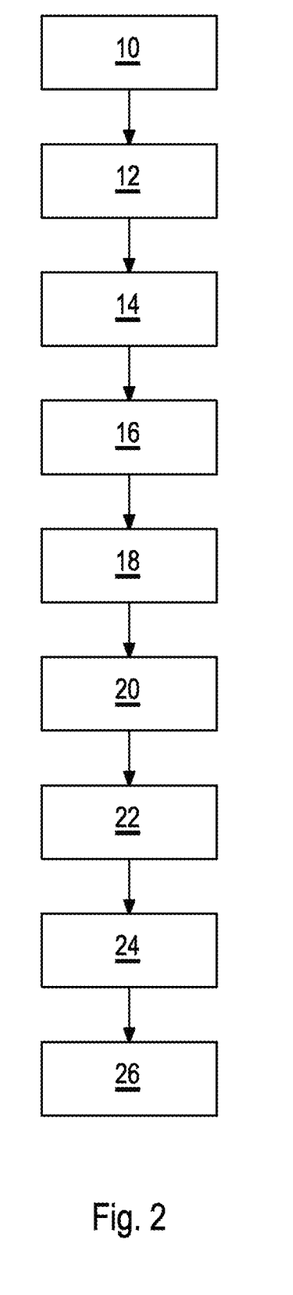
FIG. 2 schematically illustrates a flow diagram of an embodiment of the proposed method.

FIG. 2 schematically illustrates an embodiment of the proposed method. As illustrated in FIG. 2, after measuring/obtaining, using at least one measuring device, color values, texture values and digital images of a target coating at step 10, one or more preliminary matching formulas are retrieved at step 12 from a database which comprises formulas for coating compositions and interrelated color values, interrelated texture values, and interrelated digital images. The one or more preliminary matching formulas are retrieved based on the color values and/or the texture values obtained for the target coating. The preliminary matching formulas are chosen among the plurality of formulas of the database based on a first matching metric which is defined by a color difference metric between the target coating and a sample coating of a respective formula of the plurality of formulas. Those formulas whose respective first matching metric with respect to the target coating is smaller than or equal to a predefined/pregiven threshold value are selected as preliminary matching formulas. It is possible that only one formula is selected as preliminary matching formula. As a further criterion for selecting the preliminary matching formulas, at least one texture difference metric, e.g. at least one of the texture differences dSi, dSa, dG can be determined for respective sample coatings of the formulas of the database in relation to the target coating. The color difference and the at least one texture difference can be summed up, particularly by a weighted sum. At step 14 and as described before, the obtained images of the target coating can be subjected to a pre-analysis in order to detect and to mask out corrupt areas, such as scratches. After such a pre-analysis, at step 16 an image analysis, as described hereinabove, is used to determine the sparkle points of each of the obtained images for the target coating and of each of the images associated with the one or more preliminary matching formulas and retrieved from the database. Such image analysis is performed using a computer processor in operative conjunction with at least one filtering technique. Once the sparkle points have been determined and isolated, at least one subimage of each sparkle point in the obtained images and in the images associated with the one or more preliminary matching formulas is created at step 18, respectively. The created subimages are provided to a convolutional neural network (CNN) at step 20. The neural network is trained to correlate a respective subimage of a respective sparkle point with a pigment and/or a pigment class and to identify, i.e. to output, based on the respective subimage of the respective sparkle point, the pigment and/or the pigment class.

At step 22, for the target coating and for each preliminary matching formula, a respective statistic of the identified pigments and/or pigment classes is determined and outputted, respectively. Such output could be made using a display device, such as a screen. The statistic determined for the target coating is compared at step 24 with the statistics determined for the one or more preliminary matching formulas, respectively. At step 26, at least one of the one or more preliminary matching formulas is determined as best matching with the target coating.

Figure 3:
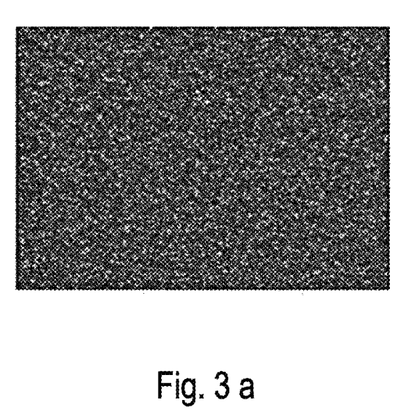

FIG. 3a shows an original HDR (High Dynamic Range) image of a target coating. In the image analysis, at a first step, intensity values of the original image of the target coating are analysed and adapted, as needed, in order to depict the structures of the image as best as possible. Thus, disturbing factors which may result from uneven lighting conditions may be eliminated. Then, according to one possible embodiment of the proposed method, the image analysis uses image segmentation techniques to identify the locations of the sparkle points in the image (different algorithms may be used to identify the sparkle points and to get information about brightness and location of the different sparkle points). An image mask as shown in FIG. 3b is created that identifies the sparkle point locations based on color, texture, and/or their gradients. In doing so, the image may be transformed via thresholding into a binary image, the binary image being further segmented using contiguous areas and a blob detection being performed at these segments. The sparkle points described by their respective brightness and location are copied and pasted into an empty image with a black background, thus creating the image mask as shown in FIG. 3b. Within the created image mask every pixel of the image is labelled with either '0', indicating that said pixel is not part of a sparkle point, or '1' indicating that said pixel is part of a sparkle point. The sparkle points are clearly visible against the black background. That means that due to the filtering/thresholding all sparkle points of the original image (FIG. 3a) appear here as white or light grey points in the image mask shown in FIG. 3b.

Contour detection of the image mask identifies boundaries of the connected pixels for each individual sparkle point location. For final review, the identified sparkle point contours are overlaid on the original image of the target coating as shown in FIG. 3c. For better illustration, the sparkle points are presented in another color than the predominantly color of the original image of the target coating. The predominantly color of the original image of the target coating is here red (grey in the black and white image), thus the sparkle points are represented in green (light grey in the black and white image).

Figure 5:
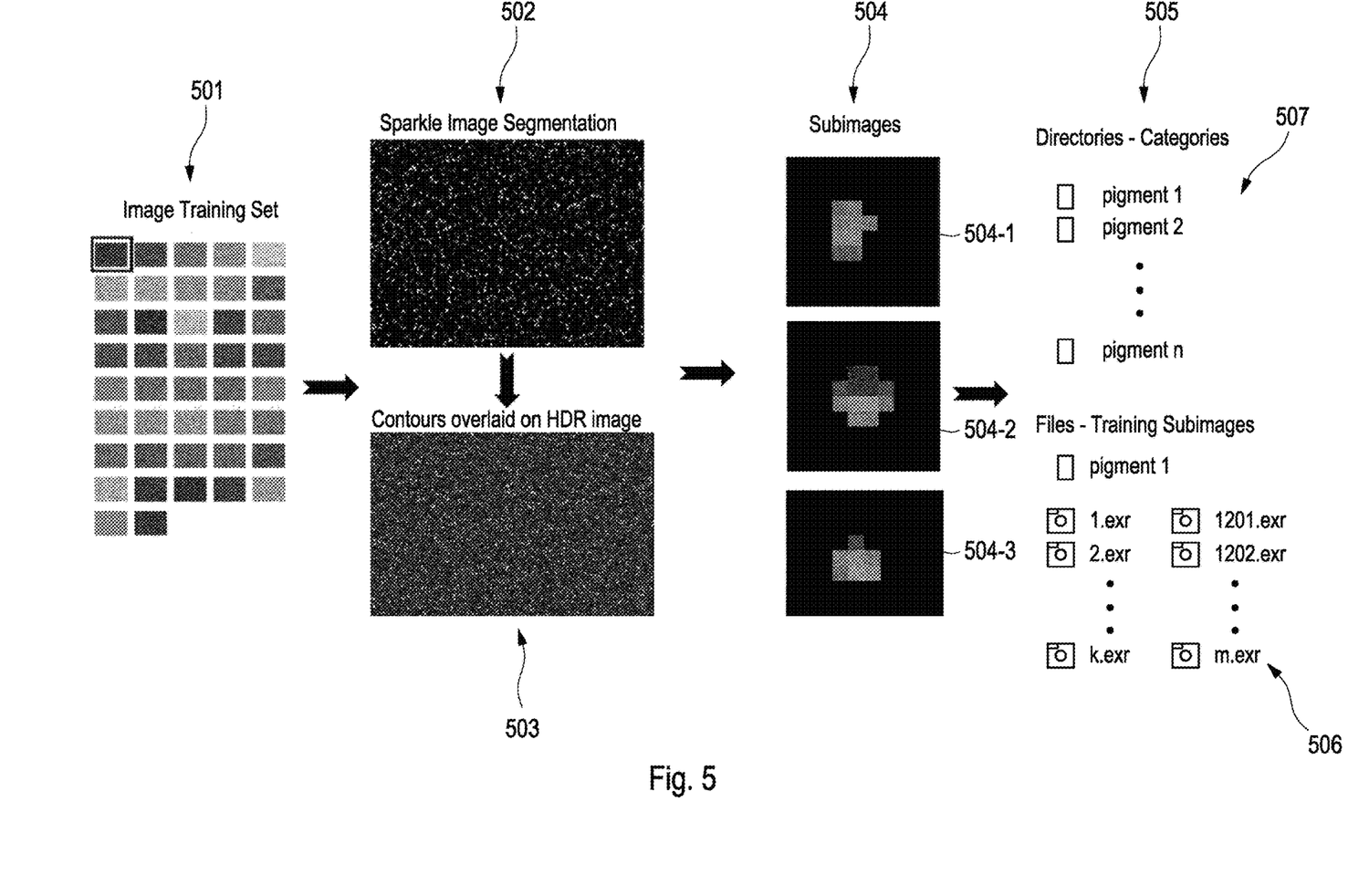
FIG. 5 schematically illustrates how a neural network training set is generated according to a possible embodiment of the proposed method.
Figure 6:
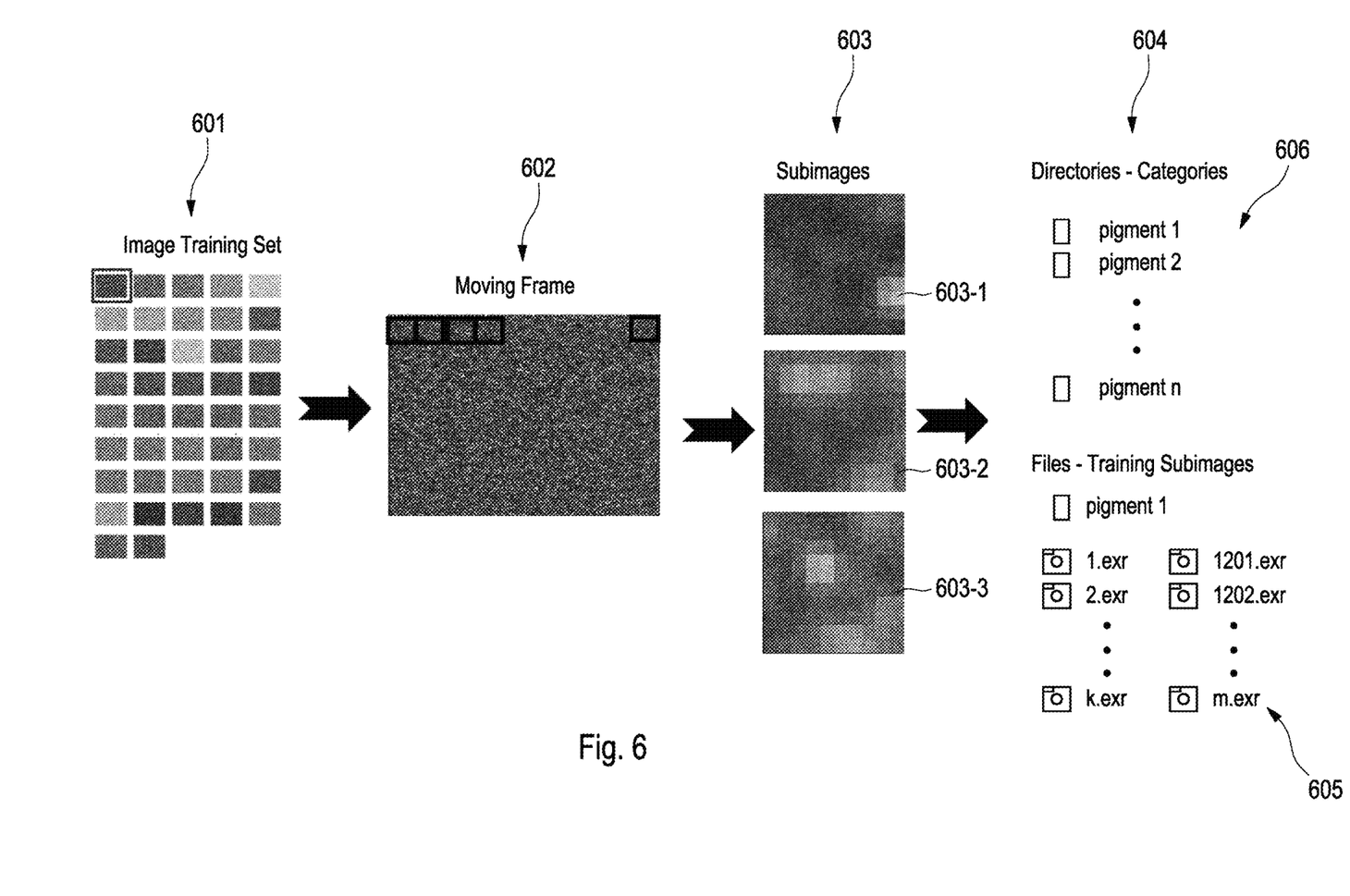
FIG. 6 schematically illustrates how a neural network training set is generated according to another possible embodiment of the proposed method.

As shown in FIGS. 5 and 6, subimages are created for all sparkle points identified in the image (i.e. in the image mask) by extracting for each sparkle point RGB data from the original HDR image for the associated pixel locations and placing those extracted RGB data in the center of a standard image frame where the RGB pixel data of this standard image frame was previously initialized with '0' (black) in order to provide a defined background.

Figure 4:
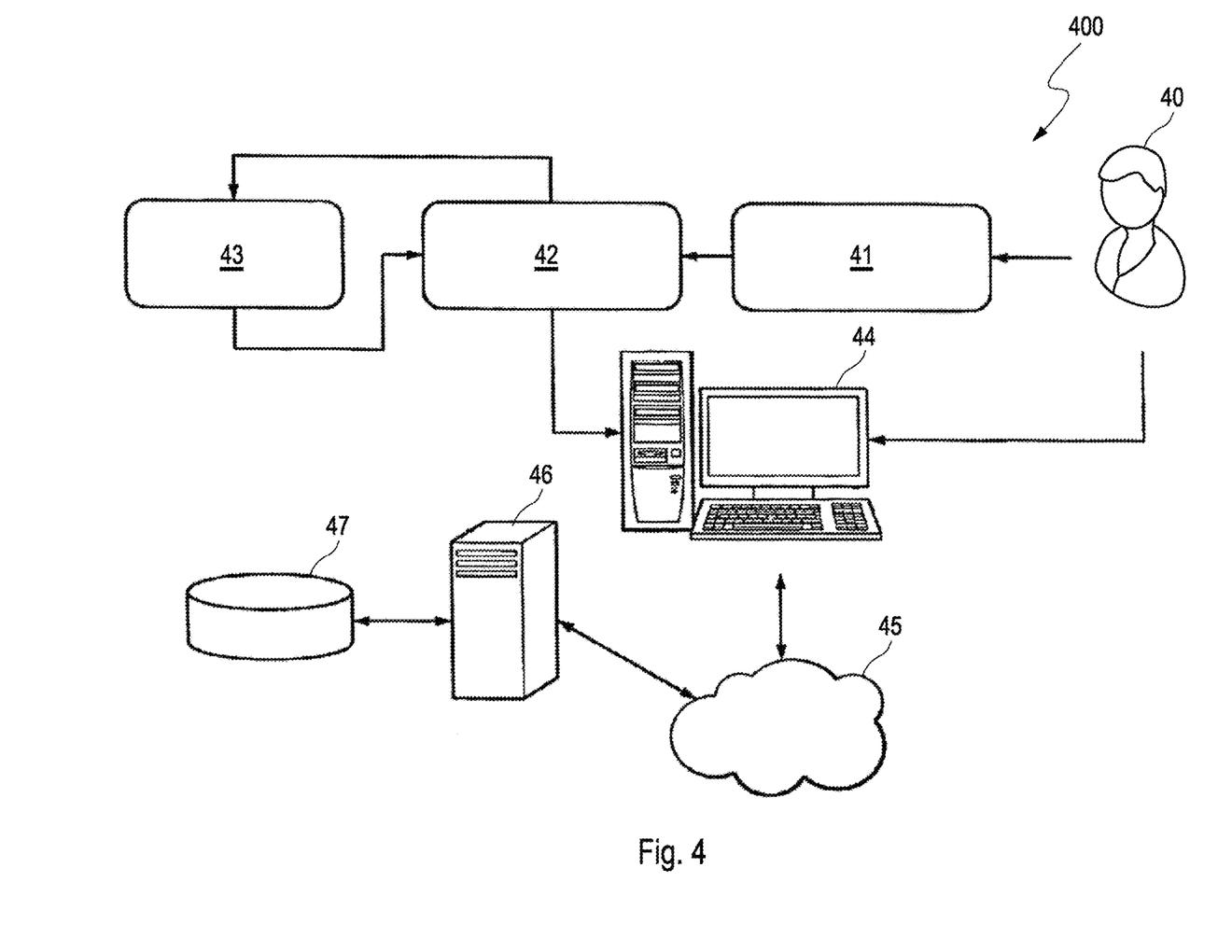
FIG. 4 shows an embodiment of the proposed device.

FIG. 4 illustrates an embodiment of a device 400 which may be used to identify pigments and/or pigment classes of pigments of a coating mixture of a target coating. A user 40 may utilize a user interface 41, such as a graphical user interface, to operate at least one measuring device 42 to measure the properties of a target coating 43, i.e. to capture digital images of the target coating by means of a camera, each image being obtained at a different image-based texture measurement geometry, e.g. at a different angle, and to determine color values and texture values for different spectral measurement geometries, using, for instance, a spectrophotometer. The data from the at least one measuring device, e.g the camera 42 may be transferred to a computer 44, such as a personal computer, a mobile device, or any type of processor. The computer 44 may be in communication, i.e. in a communicative connection, via a network 45, with a server 46. The network 45 may be any type of network, such as the Internet, a local area network, an intranet, or a wireless network. The server 46 is in communication with a database 47 that may store the data and information that are used by the methods of embodiments of the present invention for comparison purposes. In various embodiments, the database 47 may be utilized in, for example, a client server environment or in, for example, a web based environment such as a cloud computing environment. Various steps of the methods of embodiments of the present invention may be performed by the computer 44 and/or the server 46. In another aspect, the invention may be implemented as a non-transitory computer readable medium containing software for causing a computer or computer system to perform the method described above. The software can include various modules that are used to enable a processor and a user interface to perform the methods described herein.

FIG. 5 schematically illustrates one possibility how a neural network training set can be generated which may be used to train a neural network to identify pigments and/or pigment classes of pigments of a coating mixture of a target coating. Generally, a finite number of toners/effect pigments is given. For each effect pigment, digital images, particularly HDR images, are captured from a coating comprising as pigment only said respective effect pigment. These digital images are associated with the respective effect pigment and stored in a database, i.e. a directory 501. When training the neural network, each such digital image is segmented as described before in order to isolate the sparkle points at step 502. At step 503, the identified sparkle points of such a digital image are overlaid onto the original image. At step 504 subimages of each sparkle point are created from the digital image. In doing so, for each sparkle point RGB data are extracted from the original HDR image for the associated pixel locations and placed in the center of a standard image frame where the RGB pixel data of this standard image frame was previously initialized with '0' (black) in order to provide a defined background. In the case shown here, the subimages 504-1, 504-2, 504-3 are created from the digital image in black background. As it is known, which pigment is comprised by the coating, at step 505 all the created subimages can be unambiguously correlated with the respective pigment and stored in a folder 506 of the respective pigment. The folders of all the pigments are stored in a directory 507. Thus, the input neurons, i.e. the input images, particularly the respective subimages of coatings each comprising exactly one pigment, as well as the output neurons, i.e. the respective pigments comprised by the coatings, are known and can be used to train the neural network.

FIG. 6 schematically illustrates another possibility how a neural network network training set can be generated which may be used to train a neural network to identify pigments and/or pigment classes of pigments of a coating mixture of a target coating. Generally, a finite number of toners/effect pigments is given. For each effect pigment, digital images are captured from a coating comprising as pigment only said respective effect pigment. These digital images are associated/interrelated with the respective effect pigment and/or pigment class and stored in a database, i.e. a directory 601. When training the neural network, each such digital image is overlaid with a frame that is moved over the image, i.e. moved from pixel to pixel from left to right, top to bottom of the image, finding pixels in order to isolate the sparkle points at step 602. At step 603 subimages of each sparkle point are created from the digital image. In the case shown here, the subimages 603-1, 603-2, 603-3 are created from the digital image by extracting the moving frame from the digital image, respectively. As it is known, which pigment is comprised by the coating, at step 604 all the created subimages can be unambiguously correlated with the respective pigment and/or pigment class and stored in a folder 605 of the respective pigment and/or pigment class. The folders of all the pigments and/or pigment classes are stored in a directory 606. Thus, the input neurons as well as the output neurons are known and can be used to train the neural network.

Figure 7:
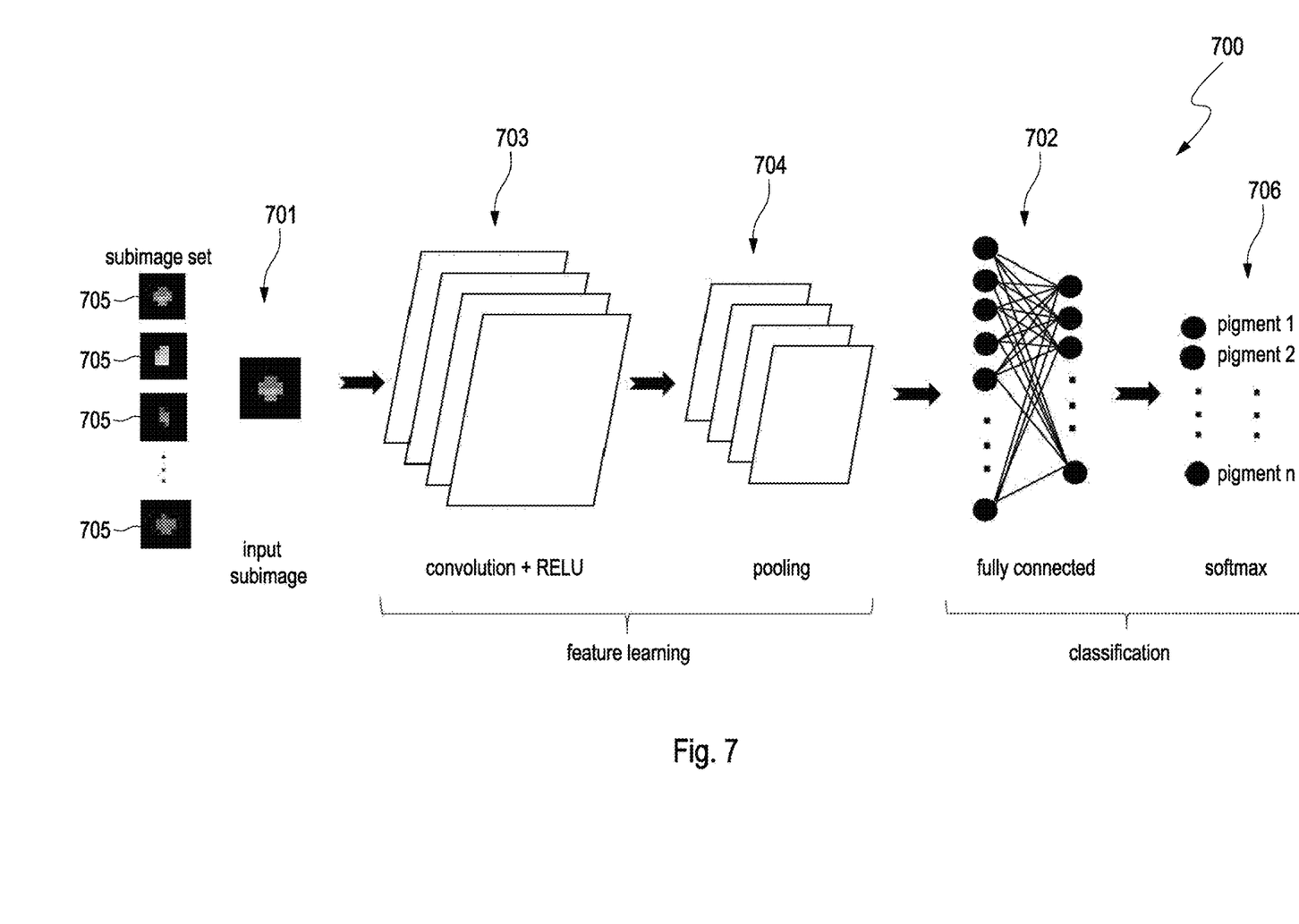
FIG. 7 schematically illustrates a neural network used in still a further embodiment of the proposed method.

FIG. 7 illustrates a convolutional neural network 700 that can be used to identify pigments and/or pigment classes of pigments of a coating mixture of a target coating. One neural network for use in this context is based on a learning process referred to as backpropagation. The neurons of the neural network are arranged in layers. These include a layer with input neurons (input layer), a layer with output neurons (output layer), and one or more inner layers. The output neurons are the pigments or pigment classes of the paint formulation that are to be determined. Input neurons used for the neural network are the subimages created of the sparkle points which have been beforehand determined in the digital images of the target coating and/or in the digital images associated with one or more preliminary formulas matching the target coating. Generally, a convolutional neural network (CNN) is a neural network that uses convolution in place of general matrix multiplication in at least one of its layers. The convolutional neural network consists of an input layer 701, and an output softmax layer 706, as well as feature learning and classification inner layers. The feature learning section of a CNN typically consists of a series of convolutional layers 703 that convolve with a multiplication or other dot product. The activation function is commonly a RELU (rectified linear unit) layer, and subsequently followed by a pooling layer 704 that reduces dimensionality of the convolution. The classification section of the CNN consists of fully connected layers 702 and the output softmax layer 706 for calculating multi-class probabilities. The neural network 700 is trained using a backpropagation algorithm that minimizes the error between actual and predicted outputs by adjusting the weights in the convolutional and dense layers as the training examples are presented to the neural network.

The input neurons are given by subimages 705 which are extracted from a digital image of a target coating and/or from images retrieved from a database as images associated with one or more preliminary matching formulas. The neural network 700 has been previously trained by training data as described exemplarily in FIGS. 5 and 6. Those subimages 705 are assigned via the neural network 700 to a pigment and/or a pigment class 706.

It can be understood that embodiments of the invention may be used in conjunction with other methods for pigment identification using texture parameters, e.g. hue, intensity, size and/or reflectance data. In various embodiments, in order to properly identify the type of toners, or an offset thereof, used in an unknown or target coating, it is desirable to observe the correct angles and compare back to existing known toners in a database that has been previously created. Binary mixtures of toners may be generated to evaluate the impact of various concentrations of the toners on their sparkle color attribute.

| List of reference signs | |
|---|---|
| 100 | specular angle |
| 111 to 115 | light sources |
| 120 | camera |
| 130 | target coating |
| 10 | method step |
| 12 | method step |
| 14 | method step |
| 16 | method step |
| 18 | method step |
| 20 | method step |
| 22 | method step |
| 24 | method step |
| 26 | method step |
| 400 | device |
| 40 | user |
| 41 | user interface |
| 42 | measuring device |
| 43 | target coating |
| 44 | computer |
| 45 | network |
| 46 | server |
| 47 | database |
| 501 | directory |
| 502 | sparkle image segmentation |

-continued

| List of reference signs | |
|---|---|
| 503 | contours overlaid on HDR image |
| 504 | creation of subimages of each sparkle point |
| 504-1 | |
| 504-2 | subimages of a sparkle point |
| 504-3 | |
| 505 | correlating of subimages with pigments |
| 506 | folder |
| 507 | directory |
| 601 | directory |
| 602 | step of moving a frame over a digital image |
| 603 | creation of subimages of each sparkle point |
| 603-1 | |
| 603-2 | subimages |
| 603-3 | |
| 604 | correlating of subimages with pigments |
| 605 | folder |
| 606 | directory |
| 700 | neural network |
| 701 | input layer |
| 702 | fully connected layer |
| 703 | convolutional + RELU layers |
| 704 | pooling layer |
| 705 | subimages |
| 706 | softmax layer |

The invention claimed is:

1. A computer-implemented method comprising at least the following steps:
obtaining, using at least one measuring device, color values, texture values and digital images of a target coating,
retrieving from a database which comprises formulas for coating compositions and interrelated color values, interrelated texture values, and interrelated digital images, one or more preliminary matching formulas based on the color values and/or the texture values obtained for the target coating,
performing, using a computer processor in operative conjunction with at least one filtering technique, for each of the obtained images of the target coating and the images interrelated with the one or more preliminary matching formulas, an image analysis to determine at least one sparkle point within the respective images,
creating subimages of each sparkle point from the respective obtained images and from the respective images interrelated with the one or more preliminary matching formulas,
providing the created subimages to a convolutional neural network, the convolutional neural network being trained to correlate a respective subimage of a respective sparkle point with a pigment and/or pigment class and to identify the pigment and/or pigment class based on the respective subimage of the respective sparkle point,
determining and outputting, for the target coating and for each preliminary matching formula, a statistic of the identified pigments and/or pigment classes, respectively, wherein the statistic determined for the target coating and the statistics determined for the one or more preliminary matching formulas can each be presented as a respective histogram and/or as a respective vector,
comparing, using a computer processor, the statistic determined for the target coating with the statistics determined for the one or more preliminary matching formulas, and determining at least one of the one or more preliminary matching formulas as the formula(s) best matching with the target coating.

2. The method according to claim 1, further comprising deriving from each subimage a correlation for at least one pigment, wherein the correlation indicates a contribution of the at least one pigment to a distribution of the sparkle points within the respective image from which the subimage had been cut out.

3. The method according to claim 1, wherein the image analysis for each image comprises creating a mask, identifying contours and overlaying a frame on the respective image, thus creating the subimages of each sparkle point from the respective image.

4. The method according to claim 1, wherein a correlation of each subimage for each measurement geometry with at least one pigment is derived by means of the convolutional neuronal network which is configured to classify each subimage of a respective sparkle point for each measurement geometry with a pre-given probability to a specific pigment and/or pigment class.

5. The method according to claim 4, wherein each derived correlation for each measurement geometry, at which the respective subimage is taken, is used to adapt a contribution of the at least one pigment and/or pigment class when determining the best matching formula.

6. The method according to claim 1, wherein determining the best matching formula comprises providing a list of pigments with respective quantities and/or concentrations.

7. The method according to claim 1, wherein each subimage is created with an image area based on a maximum size of the at least one sparkle point in a black background.

8. A device comprising:
a database, which comprises formulas for coating compositions and interrelated color values, interrelated texture values, and interrelated digital images,
at least one processor, which is in communicative connection with at least one measuring device, the database, at least one filtering technique, and a convolutional neural network, and programmed to execute at least the following steps:
receiving, from the measuring device, color values, texture values and digital images of a target coating,
retrieving from the database one or more preliminary matching formulas based on the color values and/or the texture values obtained for the target coating,
performing, by using the filtering technique, for each of the obtained images of the target coating and the images interrelated with the one or more preliminary matching formulas, an image analysis to determine at least one sparkle point within the respective images,
creating subimages of each sparkle point from the received images and from the images interrelated with the one or more preliminary matching formulas,
providing the created subimages to the convolutional neural network, the convolutional neural network being trained to correlate a respective subimage of a respective sparkle point with a pigment and/or a pigment class, and to identify the pigment and/or the pigment class based on the respective subimage of the respective sparkle point,
determining and outputting, for the target coating and for each preliminary matching formula, a statistic of the identified pigments and/or pigment classes, respectively, wherein the statistic determined for the target coating and the statistics determined for the one or more preliminary matching formulas can each be presented as a respective histogram and/or as a respective vector,
comparing the statistic determined for the target coating with the statistics determined for the one or more preliminary matching formulas, and
determining at least one of the one or more preliminary matching formulas as the formula(s) best matching with the target coating.

9. The device according to claim 8, further comprising the at least one measuring device, the filtering technique and/or the convolutional neural network.

10. The device according to claim 8, wherein the processor is further configured to execute the step of deriving from each subimage a correlation for at least one pigment, wherein the correlation indicates a contribution of the at least one pigment to a distribution of the sparkle points within the respective image from which the subimage had been cut out.

11. The device according to claim 8, wherein the processor is further configured to derive a correlation of each subimage for each measurement geometry with at least one pigment by means of the convolutional neuronal network which is configured to classify each subimage of a respective sparkle point for each measurement geometry with a pre-given probability to a specific pigment and/or pigment class.

12. The device according to claim 11, wherein the processor is further configured to use each derived correlation for each measurement geometry, at which the respective subimage is taken, to adapt a contribution of the at least one pigment and/or pigment class when determining the best matching formula.

13. The device according to claim 8, which further comprises an output unit configured to output the determined best matching formula.

14. A device configured to execute the method according to claim 1.

15. A non-transitory computer readable medium with a computer program with program codes that are configured, when the computer program is loaded and executed by at least one processor, which is in a communicative connection with at least one measuring device, a database, a filtering technique and a convolutional neural network, to execute at least the following steps:
receiving, from the measuring device, color values, texture values and digital images of a target coating,
retrieving from the database which comprises formulas for coating compositions and interrelated color values, interrelated texture values, and interrelated digital images, one or more preliminary matching formulas based on the color values and/or the texture values obtained for the target coating,
performing, by using the filtering technique, for each of the obtained images of the target coating and the images interrelated with the one or more preliminary matching formulas, an image analysis to determine at least one sparkle point within the respective images,
creating subimages of each sparkle point from the received images and from the images interrelated with the one or more preliminary matching formulas,
providing the created subimages to the convolutional neural network, the convolutional neural network being trained to correlate a respective subimage of a respective sparkle point with a pigment and/or a pigment class and to identify the pigment and/or the pigment class based on the respective subimage of the respective sparkle point, determining and outputting, for the target coating and for each preliminary matching formula, a statistic of the identified pigments and/or pigment classes, respectively, wherein the statistic determined for the target coating and the statistics determined for the one or more preliminary matching formulas can each be presented as a respective histogram and/or as a respective vector, comparing the statistic determined for the target coating with the statistics determined for the one or more preliminary matching formulas, and determining at least one of the one or more preliminary matching formulas as the formula(s) best matching with the target coating.

* * * * *